United States Patent [19]

Wegscheider

[11] Patent Number: 5,176,242
[45] Date of Patent: Jan. 5, 1993

[54] CONVEYING PLANT HAVING AN INTEGRATED BUFFER STORE

[75] Inventor: Hans J. Wegscheider, Isny, Fed. Rep. of Germany

[73] Assignee: Natec, Reich, Summer GmbH & Co. KG, Fed. Rep. of Germany

[21] Appl. No.: 691,698

[22] Filed: Apr. 26, 1991

[30] Foreign Application Priority Data

Apr. 28, 1990 [DE] Fed. Rep. of Germany ....... 4013687

[51] Int. Cl.⁵ ............................................. B65G 1/00
[52] U.S. Cl. ................................................ 198/347.3
[58] Field of Search .................................... 198/347.3

[56] References Cited

U.S. PATENT DOCUMENTS

| | | | |
|---|---|---|---|
| 3,499,555 | 3/1970 | Wahle | 198/347.3 |
| 3,656,635 | 4/1972 | Schafer et al. | 414/796 |
| 4,147,081 | 4/1979 | Pellaton | 198/445 X |
| 4,220,236 | 9/1980 | Blidung et al. | 198/347.3 |
| 4,273,234 | 6/1981 | Bourgeois | 198/347.3 |
| 4,718,536 | 1/1988 | Toby | 198/469.1 |
| 4,830,170 | 5/1989 | Focke | 198/347.3 |
| 5,009,303 | 4/1991 | Lutzke | 198/347.3 |
| 5,038,909 | 8/1991 | Covert | 198/347.3 |

FOREIGN PATENT DOCUMENTS

| | | |
|---|---|---|
| 1273414 | 3/1969 | Fed. Rep. of Germany . |
| 2605985 | 8/1976 | Fed. Rep. of Germany . |
| 2640867 | 3/1977 | Fed. Rep. of Germany . |
| 3347552 | 7/1985 | Fed. Rep. of Germany . |
| 1393361 | 12/1965 | France . |
| 74025172 | 5/1976 | Sweden . |

Primary Examiner—Robert P. Olszewski
Assistant Examiner—Cheryl L. Gastineau
Attorney, Agent, or Firm—Brown, Martin, Haller & McClain

[57] ABSTRACT

A conveying plant for products to be packaged is described, comprising an integrated buffer store, wherein items are fed to a packaging machine by means of a supply system and are withdrawn from a buffer store when gaps occur in the conveying flow. To reduce production costs and ensure compactness and an optimum number of buffer locations in the conveying system, provision is made for at least one vertically displaceable lift magazine to be arranged in the area of the supply system, which incorporates shelves arranged vertically one above the other, each shelf base being appropriate for reception and discharge of an item for packaging.

6 Claims, 4 Drawing Sheets

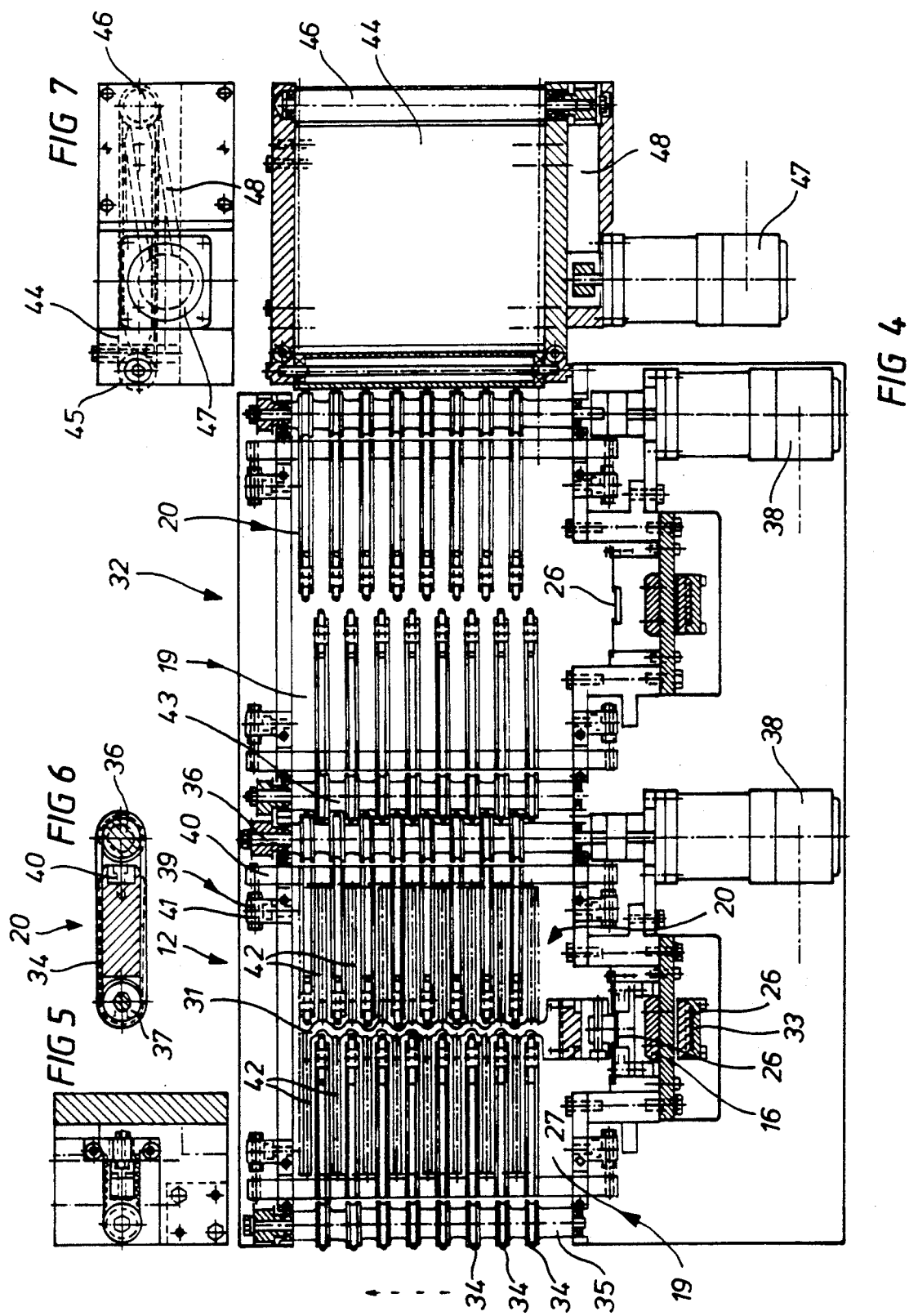

CONVEYING PLANT HAVING AN INTEGRATED BUFFER STORE

BACKGROUND OF THE INVENTION

1. Field of the Invention

The present invention relates to a conveying plant for items to be packaged, comprising an integrated buffer store wherein items from a supply system are fed to a packaging machine and items are withdrawn from a buffer store when gaps occur in the conveying flow.

DESCRIPTION OF THE PRIOR ART

Conveying plants of this type, comprising an integrated buffer store, are known. A problem which arises with this known conveying plant is that of supplying items which are to be packaged to a packaging machine post-connected to conveying plant with a minimum of interruptions. It is known that such items may be placed one behind another on belt conveyors which in turn are arranged one behind the other but are driven separately. When the packaging machine is free to receive items for packaging, it requests the leading item from the leading belt conveyor of this line. If the product flow is interrupted, the packaging machine still draws the residual items resting on the conveyors. A breakdown in the flow of product then occurs however and a gap is produced in the conveying system. It has been known until now that such a gap may be prevented by means of a buffer system. A first example of such known buffer systems has the feature that the speed of the individual belts within the supply system is increased commensurately, so that the gap incurred may be made up and closed between the items to be supplied, as rapidly as possible. The disadvantages of this known embodiment are that the length of these supply stations is comparatively great because of the comparatively large number of buffer belts and that production costs are comparatively high because a separately controllable drive has to be provided for each individual buffer belt.

Attempts have been made to reduce the overall belt length by providing a second layer of buffer belts vertically above the first such layer. The length could in practice thus be halved, but with the disadvantage that the costs could not be reduced, because a separately controllable drive still had to be provided for each individual belt.

SUMMARY OF THE INVENTION

It is accordingly an object of the present invention to provide a conveying system of the type described in the foregoing wherein an optimum number of buffer locations is available, with comparatively low production costs and small space requirement, to ensure an uninterrupted flow of material to the post-connected packaging machine.

This object is achieved in accordance with the invention in that at least one vertically displaceable lift store is situated in the area of the supply system, which incorporates shelves positioned vertically one above the other each shelf being adapted to receive and discharge one item in each case.

It is a further object of the present invention to avoid the previously used vertical separation between conveyor belts, wherein a lower layer of conveyor belts is confronted by an upper layer, by providing at least one lift magazine, vertically displaceable from a single conveyor belt system, which acts as a buffer station to receive the incoming items and to discharge the items received, with or without a delay, according to requirements. This secures the substantial advantage that separately driven conveyor belts need only be provided in one plane, thereby greatly reducing the space required on the one hand and the production costs on the other.

Each item received in or discharged from the lift magazine may comprise several individual packs or packages which are to be packed together.

It is a further object of the invention to provide a conveying system of little technical complexity, with few moving parts, the system thus being of the low-maintenance and low-cost production type.

For packaging easily spoilt products, it is preferable to use a plurality of lift magazines. If only a single lift magazine is used, the easily spoilt product may be kept on the shelf of this lift magazine for an indefinite period and deteriorate during this period.

To prevent this, two or more lift magazines are preferably arranged one behind the other on the conveying direction. In this way, it is possible by alternate energisation of the lift magazines to discharge the lift magazines rapidly in each case and to refill one lift magazine during the emptying of another. It is thus ensured that the item may be conveyed into a lift magazine within a short period and may again be conveyed out of the lift magazine rapidly, even in the case of considerable hold-ups in the conveying flow, because—during retention in the one lift magazine—the easily spoilt product is already discharged again from the other lift magazine.

In this manner, it is even possible that a package discharged from one lift magazine may be kept in a post-connected lift magazine.

A one-track packaging system is described in the following detailed description. It will however be apparent to a person skilled in the art that the system described may also be produced with two tracks, i.e. the system described could be twinned symmetrically about a central longitudinal axis and would then be present in doubled form.

The buffer system described herein consequently consists of a "FILO" system. Since a system of this kind may be disadvantageous in the case of spoilable packs however, in a preferred embodiment of the invention another lift magazine is post-connected in the conveying direction, which may by means of a priority change override this "FILO" conveying system and convert the same into a "FIFO"-like system.

Further objects, advantages and features of the invention will become apparent from the following detailed description of the invention, when read with reference to the accompanying drawings which illustrate a preferred embodiment thereof.

BRIEF DESCRIPTION OF THE DRAWINGS

In the drawings:

FIG. 4 shows a plan view of the conveying system in the direction of the arrow IV in FIG. 2;

FIG. 5 shows a sideview of an arrival-side drive unit in the system of FIG. 1;

FIG. 6 shows a cross-sectional view of a conveyor belt in the region of the lift magazine in the system of FIG. 1 and FIG. 7 shows the sideview of an "accumulator" belt situated at the output end of the system of FIG. 1.

DETAILED DESCRIPTION OF THE PREFERRED EMBODIMENT

Figure 1:
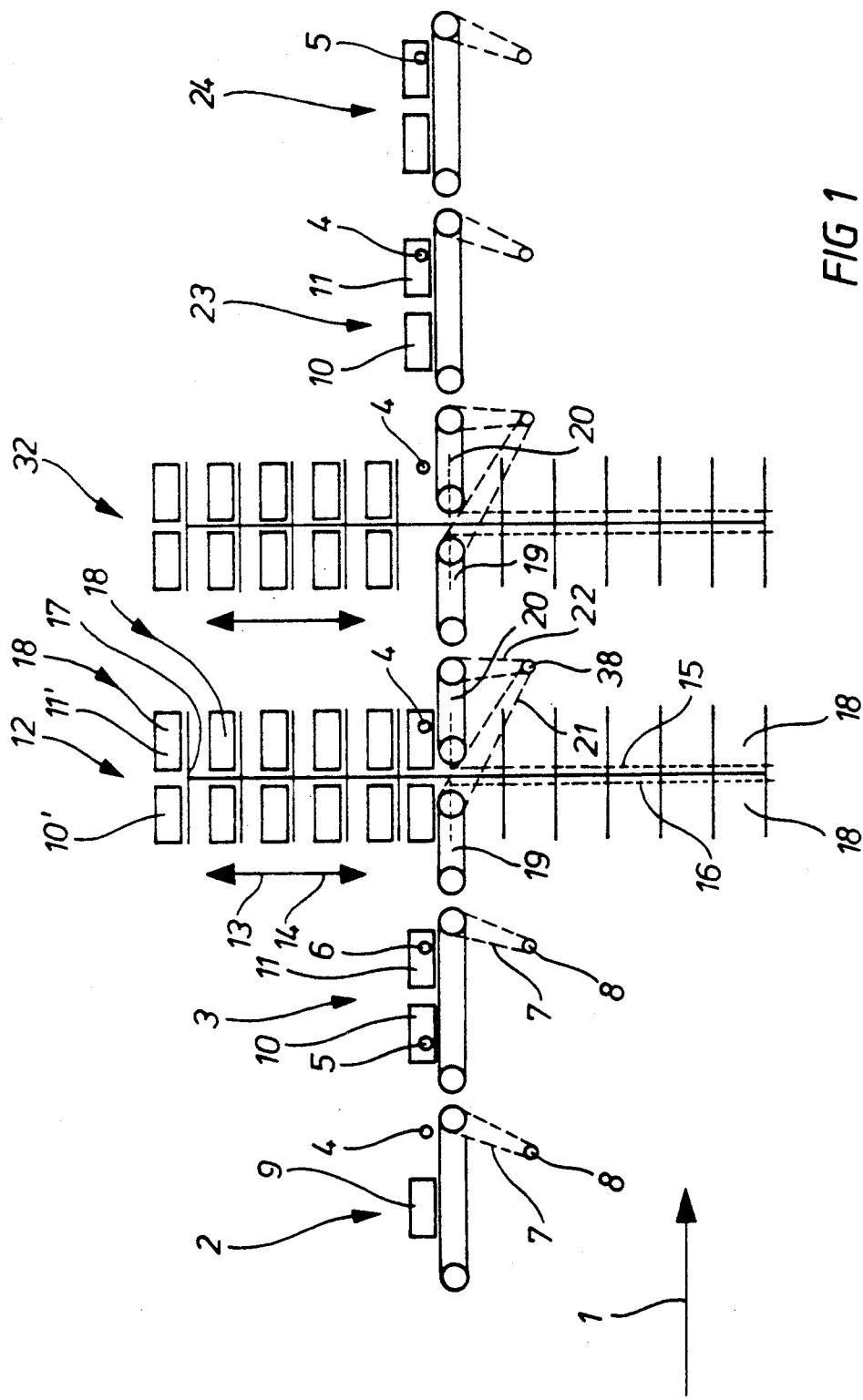
FIG. 1 shows a schematic side view of a conveying system according to the invention.
Figure 2:
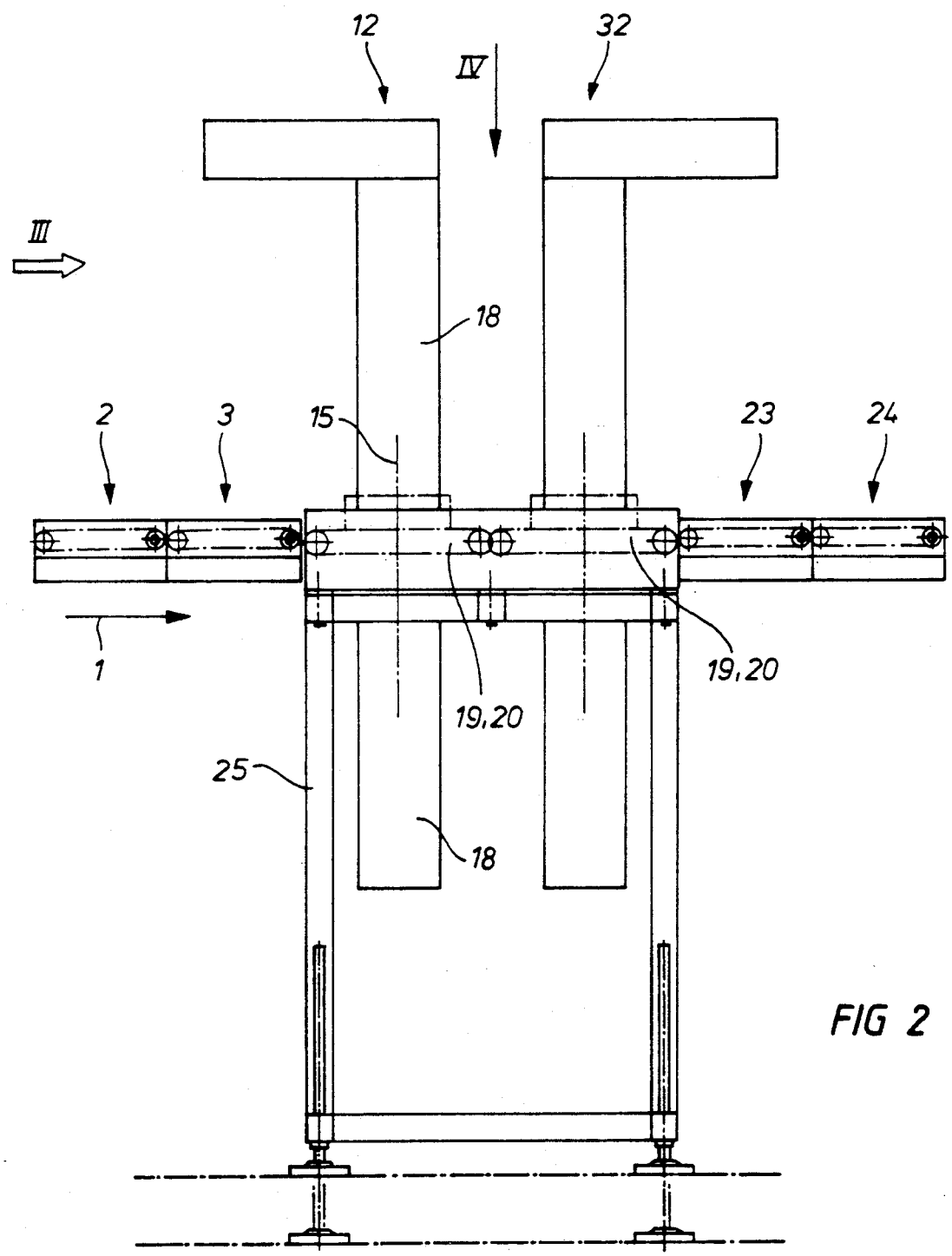
FIG. 2 shows the conveying system of FIG. 1 in an outline drawing.

In FIG. 1, a conveying system according to the invention comprises several singly-driven belt conveyors arranged one after another in series, a first arrival-side conveyor being described as a pickup conveyor 2. This pickup conveyor 2 is followed by an infeed conveyor 3.

Buffer conveyors 23, 24, or the like, are arranged on the delivery side of the conveying system according to the invention.

Each conveyor 2, 3, 23, 24 is driven via a drive belt 7 and a separately driven toothed belt pulley 8, from an individually controllable drive means.

Light barriers 4, 5, 6 which detect the passage of items are arranged in each case within the area of the conveyor 2, 3, 23, 24, in question. In response to signals from these light barriers, control is then exercised over the operative and inoperative periods of the conveyor in question and, commensurately, over the drive of the lift magazine 12, 32 in question.

Identical reference symbols have been used in the drawings for identical parts, the conveyors 2, 3, 23, 24 being of precisely identical construction.

A pack 9 entering the conveying system in the conveying direction 1 is initially received by the pickup conveyor 2 arranged on the arrival side and is then made to catch up with another pack on the post-connected infeed conveyor 3. For simplicity the packs present on the infeed conveyor 3 are accordingly denoted by 10, 11.

The two packs 10, 11 are brought together in the following manner:

The pickup conveyor 2 is energised first and carries the pack 9 in the conveying direction 1 on to the energised infeed conveyor 3, until the pack 9 reaches the position of the pack 10. This position is detected by the light barrier 5. The infeed conveyor 3 then stops and the next pack runs on to the pickup conveyor 2 and stops at the point of the light barrier 4.

Both conveyors 2, 3 are then energised, whereupon the pack 10 reaches the position of the pack 11 and the pack 9, which had been present on the pickup conveyor 2, then takes the place of the pack 10. Both conveyors are then stopped and establish the pattern of the two packs 10, 11, as shown on the infeed conveyors 3.

As illustrated in FIG. 1, the same conditions are provided on the delivery side of the conveying system, i.e. the packs 10, 11 are present in pairs on each buffer conveyor 23, 24.

This pairing of packs 10, 11 is a special application of the present invention but not an essential feature of it. It is obvious that even individual packs 9, as shown on the pickup conveyor 2, may be processed (buffered) by means of the conveying system of the invention.

If an interruption occurs in the production flow, e.g. by a jam occurring in the post-connected packaging machine or by the production flow being interrupted on the arrival side, the buffering system then comes into operation. Lift magazines 12, 32 which are vertically displaceable are installed in the conveyor line for this purpose. It has already been stated in the foregoing that the problem posed may be resolved by means of a single lift magazine 12. It is preferred however, within the scope of the present invention (especially for processing easily spoilt products), to install two lift magazines 12, 13 positioned one after the other with mutual spacing in the conveying direction.

Only the operation of a single lift magazine 12 will be described in the following, for simplicity. The operation of the post-connected lift magazine 32 is precisely the same, so that detailed description of its functioning is not necessary.

Referring to FIGS. 1 to 4, the lift magazine 12 essentially comprises a belt conveyor 19 situated on the arrival side and a belt conveyor situated on the output side. Both conveyor belts are driven by means of a single common motor 38 (see FIG. 4).

This motor 38 transmits the drive direct to the drive shaft 36 and the drive shaft 36 is coupled interlockingly via a toothed belt to a drive shaft 35 situated on the arrival side.

Each of the belt conveyors 19, 20 comprises comparatively narrow circular-section conveyor belts 34 which are spaced from one another and driven in rotation. On the one hand, the conveyor belts 34 pass around the one drive shaft 35 and on the other hand, they are arranged self-supportingly on a deflector pulley 37, as illustrated in respect of belt conveyor 20 in FIG. 6.

The conveyor belts 34 may be tensioned by means of a tensioner device 39 as shown in FIG. 4. The tensioner device 39 essentially comprises a tensioner block 40 which exerts a thrust in displacement via a shaft 41 on the self-supporting deflector shaft 37, so that the tension of the conveyor belts 34 may thereby be adjusted continuously rather than stepwise.

It is then of importance for the conveyor belts 34 of the successively arranged conveyors 19,20 to be spaced apart with mutual offset and be partially interdigitating. This ensures a smooth transition from the one conveyor 19 to the other conveyor 20 even in the case of flat disc-like products, e.g. such as cheese packs, sausage packs and the like.

The lift magazine 12 and 32 respectively is now arranged in the area of the point of transfer from the conveyor 19 to the post-connected conveyor 20. In view of the interdigitation between the conveyor belts 34 at the point of transfer between the conveyors 19,20, the lift magazine 12 consequently carries a row of shelf bases 31 which are arranged vertically above one another but in a meandering formation, each shelf having the said meandering shape in its transverse extension with respect to the conveying direction, ensure interdigitation of the conveyor belts 34 of the individual belt conveyors 19, 20.

Each shelf 31 is firmly joined to carrying fingers 42 which have a comb-like formation and with their comb-like denticulation engage precisely into the gap between the individual conveyor belts 34 of the conveyors 19 and 20. The longitudinal axis of the carrying fingers 42 thus extends parallel to the conveying direction 1.

Since these carrying fingers 42 fit closely into the gaps between the conveyor belts 34 of the conveyors 19,20, it is thus easy to grasp even disk-like packs which are conveyed on the conveyor 19,20 in question whilst supporting them uniformly over their whole area.

All the shelf bases 31, with the carrying fingers 42 vertically adjoined thereto, are arranged on a common lifting carrier 15 in a multiple pattern and one above another with mutual vertical spacing. The shelf bases 31 with their adjoining carrying fingers thus in each case form shelves 18, each shelf receiving one or more packs 10,11.

To sum up, therefore, what is described is essentially a vertically displaceable magazine 17.

Figure 3:
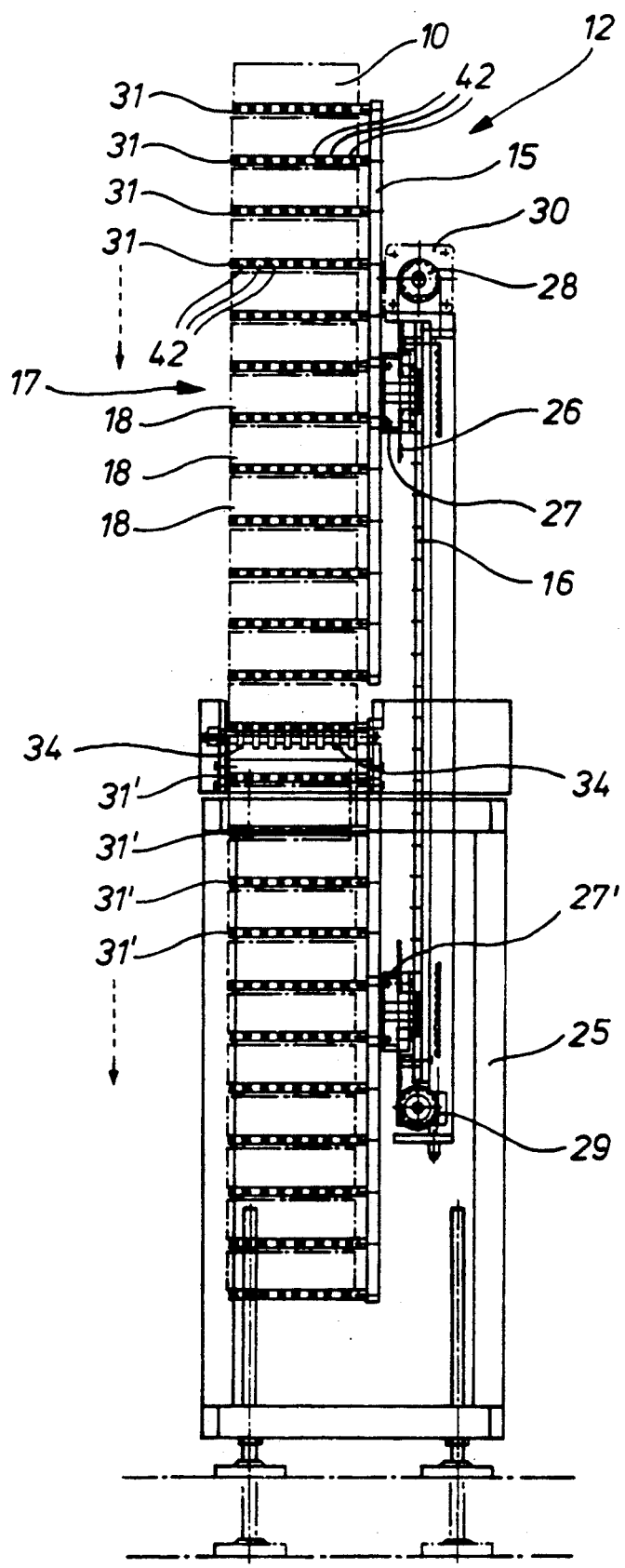
FIG. 3 shows a sideview of the conveying system of FIG. 2 in the direction of the arrow III.

The guiding means 16 for the lifting carrier 15, illustrated schematically in FIG. 1, it is shown in more detail in FIG. 3 and comprises a carrying rail in which a gripping device 27 is secured so as to be vertically displaceable, which gripping device 27 is connected to the lifting carrier 15. The gripping device 27 is firmly joined on one side to a toothed belt 26 which is led over upper and lower belt pulleys 28,29.

The upper belt pulley 28 is driven in rotation by means of a motor 30.

The whole assembly is erected within a frame 25 on a floor.

FIG. 1 furthermore depicts the synchronous drive of the belt conveyors 19,20 which had already been referred to in the foregoing. To this end, it is shown in FIG. 1 that drive belts, 21,22 are driven by the common motor 38.

Two different lift positions of the lift magazine 12 are shown diagrammatically in FIG. 3. The upper part shows the lift magazine 12 in the raised and loaded position, whereas in the lower part of FIG. 3, the lift magazine is illustrated in the lowered and emptied position.

For simplicity, the right-hand lift magazine 32 is not illustrated in FIG. 4. Its configuration corresponds precisely to that of the lift magazine 12 illustrated at the left-hand side of FIG. 4, in a precise manner.

The shelf base 31, extended by its carrying fingers 42, is omitted from this figure, to show that the belt conveyor 19,20 are self-supporting. The self-supporting structure ensures that it is possible for the shelf base 31 and the associated carrying fingers 42 to pass unimpededly through the gap between the conveyor belts 34 in the vertical direction.

The denticulation of the belt conveyor 20 positioned on the delivery side of the first lift magazine 12, with the belt conveyor 19 on the arrival side of the post-connected lift magazine 32, is also illustrated in FIG. 4. This denticulation 43 also serves the purpose of providing a smooth transfer of the packs from the one belt conveyor to the other.

The accumulator belt 23 is also illustrated diagrammatically in FIG. 4 in its connection to the lift magazine 32. In this connection, it is apparent from FIG. 7 that a closed belt 44 is present. The belt 44 runs over a deflector shaft 45 situated on the arrival side and a driven shaft 46 situated at the delivery side. The drive shaft 46 is driven by the motor via the toothed belt 48.

A tensioning device, such as described in relation to the belt conveyor 20 and in FIG. 6 may also be provided in the area of this accumulator belt 23.

Two accumulator belts 23,24 are arranged one behind the other to improve the buffer operation still further. As a matter of fact, when the first lift magazine discharges merchandise and the second lift magazine 32 is not in operation, a gap would be formed in the region of the second lift magazine 32. To fill this gap, the two accumulator belts 23,24 are arranged one behind the other to act as a buffer.

Packs should always be present on the accumulator belts 23,24 as a matter of fact and it is possible for this reason for a gap formed in front of these accumulator belts in the conveying direction to be filled by the packs resting on the actual accumulator belts 23,24. Since the carrying fingers are merely formed by straight metal parts which may be produced comparatively cheaply, the lift magazines 12,32 may be produced very economically; in particular, any conveyor belts and analogous drive systems are dispensed with in the area of the lift magazines.

What is claimed is:

1. A conveying plant for items to be packaged comprising means for conveying items from an input side to a discharge side and buffer store means positioned between said input and discharge sides, said buffer store means comprising at least one vertically displaceable lift magazine having a plurality of shelf bases arranged one above the other, each shelf base being vertically movable into and out of a position adjacent said conveying means to receive an item conveyed from said input side, and each shelf base comprising means for receiving and completely supporting at least one item to store said item and subsequently to return said item to said conveying means for discharge, said conveying means comprising a first belt conveyor on the input side of said lift magazine and a second belt conveyor separate from said first belt conveyor on the discharge side of said lift magazine, and a common motor for driving both said belt conveyors, said belt conveyors each comprising a plurality of self-supporting mutually spaced narrow conveyor belts arranged to pass around a drive shaft and a deflector shaft, the belts of one conveyor being laterally offset relative to those of the other conveyor belts, the belts of the two conveyors partly interdigitating.

2. A conveying plant according to claim 1, comprising at least two said vertical lift magazine are arranged one behind another in the conveying flow, means being provided for energising the lift magazines alternately.

3. A conveying plant according to claim 2, wherein one said lift magazine is arranged to receive and store items coming from the other said lift magazine.

4. A conveying plant according to claim 1, wherein the lift magazine is vertically arranged in the region of the point of transfer between the two said belt conveyors, the shelf bases being of a meandering shape so as to extend between the interdigitating conveyor belts.

5. A conveying plant according to claim 1, wherein each said shelf base has a transverse support member extending between said first and second belt conveyors with a plurality of carrying fingers extending therefrom in a comb-like formation, into the gaps between adjacent belts of said conveyors.

6. A conveying plant for items to be packaged comprising means for conveying items from an input side to a discharge side and buffer store means positioned between said input and discharge sides, said buffer store means comprising at least one vertically displaceable lift magazine having a plurality of shelf bases arranged one above the other, each shelf base being vertically movable into and out of a position adjacent said conveying means to receive an item conveyed from said input side, and each shelf base comprising means for receiving and completely supporting at least one item to store said item and subsequently to return said item to said conveying means for discharge, said conveying plant further comprising guide means for guiding said lift magazine for vertical displacement, the guide means comprising a guide rail and a gripping device mounted for vertical displacement on the guide rail and connected to the lift magazine.

* * * * *